(12) United States Patent
Chavda

(10) Patent No.: US 11,012,381 B2
(45) Date of Patent: May 18, 2021

(54) COMPUTING PERFORMANCE SCORES OF CONVERSATIONAL ARTIFICIAL INTELLIGENCE AGENTS

(71) Applicant: BRYGHT AI, LLC, Los Altos, CA (US)

(72) Inventor: Praful Chavda, Los Altos, CA (US)

(*) Notice: Subject to any disclaimer, the term of this patent is extended or adjusted under 35 U.S.C. 154(b) by 0 days.

(21) Appl. No.: 16/671,080

(22) Filed: Oct. 31, 2019

(65) Prior Publication Data

US 2020/0137002 A1    Apr. 30, 2020

Related U.S. Application Data

(60) Provisional application No. 62/753,433, filed on Oct. 31, 2018.

(51) Int. Cl.
| | | |
|---|---|---|
| *H04L 12/58* | (2006.01) | |
| *G06F 17/18* | (2006.01) | |
| *G06N 20/00* | (2019.01) | |

(52) U.S. Cl.
CPC .............. *H04L 51/02* (2013.01); *G06F 17/18* (2013.01); *G06N 20/00* (2019.01)

(58) Field of Classification Search
CPC .......... H04L 51/02; G06F 17/18; G06N 20/00
See application file for complete search history.

(56) References Cited

U.S. PATENT DOCUMENTS

| 2014/0108583 | A1* | 4/2014 | Kulkarni | ............. | H04M 3/5191 |
| | | | | | 709/206 |
| 2016/0099892 | A1* | 4/2016 | Palakovich | ............. | H04L 51/02 |
| | | | | | 709/206 |
| 2018/0357096 | A1* | 12/2018 | McConnell | ........... | G06F 9/4843 |
| 2019/0052650 | A1* | 2/2019 | Hu | ......................... | G06F 21/552 |
| 2019/0140986 | A1* | 5/2019 | Anderson | ............. | H04L 67/104 |
| 2019/0289025 | A1* | 9/2019 | Kursun | ..................... | H04L 41/16 |
| 2019/0306315 | A1* | 10/2019 | Portman | ............. | H04M 3/5232 |
| 2019/0347326 | A1* | 11/2019 | Kozhaya | ................. | G06F 40/35 |
| 2020/0005213 | A1* | 1/2020 | Clemens | ................ | G06Q 40/08 |
| 2020/0007380 | A1* | 1/2020 | Chen | ..................... | H04L 41/046 |
| 2020/0065334 | A1* | 2/2020 | Rodriguez | ............ | G10L 15/063 |
| 2020/0125919 | A1* | 4/2020 | Liu | ......................... | G06N 20/00 |
| 2020/0342874 | A1* | 10/2020 | Teserra | ................... | G10L 15/02 |

* cited by examiner

*Primary Examiner* — Jonathan A Bui

(74) *Attorney, Agent, or Firm* — Ravi Mohan; Rutan & Tucker, LLP

(57) ABSTRACT

Disclosed herein are systems and methods of generating a score for artificial intelligence chatbots. In some embodiments, the method includes receiving configuration data that is pre-configured as well as receiving input data which can be in many forms including historical chatbot conversation logs, real-time chatbot conversation data, or simulated chatbot conversation logs based on simulated users generating prompts via artificial intelligence. The input data is then parsed based on the configuration data and then processed. The parsed data processing can include generating a variety of scores including a navigation efficiency score, a compliance score, an intent score; and a sentiment score, among others. Upon processing, an overall score can be generated based on at least the configuration data, the navigation efficiency score, the compliance score, the intent score, and the sentiment score. These overall scores can be utilized to generate further correlation reports, and can be configured to specific implementations.

19 Claims, 3 Drawing Sheets

COMPUTING PERFORMANCE SCORES OF CONVERSATIONAL ARTIFICIAL INTELLIGENCE AGENTS

PRIORITY

This application claims priority to U.S. Provisional Patent Application No. 62/753,433, filed Oct. 31, 2018, titled "Computing Performance Scores of Conversational Artificial Intelligence (Conversational AI) chatbots and virtual agents," the disclosure of which is hereby incorporated herein by reference in its entirety.

FIELD OF INVENTION

The present disclosure technically relates to computing scores for artificial intelligence agents. More particularly, the present disclosure technically relates to computing performance scores of conversational artificial intelligence chatbots and virtual agents.

BACKGROUND

Businesses and organizations have increasingly turned to the Internet as a place to generate interactions with customers via websites. As competition has grown, many businesses have sought more advanced ways to facilitate these interactions with visitors to their website. As a result, many websites now employ instant messaging ("chat") windows on their site to create an immediate interaction with existing and potential customers. These customers may desire to interact via the chat window for various reasons such as asking a question, seeking information prior to a sale, terms of use, and/or billing questions to name just a few. Businesses have found that providing chat windows during more hours of the day can increase the chance for more customer interactions.

However, staffing human agents to monitor and answer chat window interactions increases cost. Often, the cost of staffing humans on chat windows outweighs the benefits of offering the chat windows. As a result, an increasing amount of organizations and businesses are utilizing artificial intelligence agents ("chatbots") to monitor and facilitate conversation with users. These chatbots are often much cheaper to utilize than human agents and can be programmed to respond in particular desired ways.

As chatbots have increased in usage throughout the Internet, there have been limited methods of determining their effectiveness. For example, a chatbot utilized within an organization programmed to answer easy questions may or may not actually answer a user's question. Additionally, chatbots can often be trained for different purposes. A chatbot programmed to provide answers to existing customers related to their accounts with a company may be vastly different from a chatbot programmed to answer sales-related questions from potential customers about products within the same company.

SUMMARY

Computing performance scores of conversational artificial intelligence agents include a method of generating a score for an artificial intelligence chatbot, the method includes receiving configuration data, receiving input data, parsing the input data based on the configuration data, and processing the parsed data. The processing includes generating a navigation efficiency score, generating a compliance score, generating an intent score, and generating a sentiment score. Finally, the method generates an overall performance score based on at least the configuration data, the navigation efficiency score, the compliance score, the intent score, and the sentiment score.

In a further embodiment, the input data includes historical chatbot conversation logs including a plurality of conversations between the chatbot and at least one user.

In another embodiment, the input data includes real-time chatbot conversation data.

In a still further embodiment, generating the navigation efficiency score includes evaluating the number of chatbot comprehension failures.

In still another embodiment, generating the navigation efficiency score includes generating at least one sub-score.

In a yet further embodiment, generating the at least one sub-score of the navigation efficiency score includes generating a similarity score based on the number of repeated answers generated by the chatbot within each of the plurality of conversations with the at least one user.

In yet another embodiment, generating the at least one sub-score of the navigation efficiency score includes generating a verbosity score based on the number of words generating per chatbot response.

In a further embodiment again, generating the navigation efficiency score includes generating a workflow tree including a plurality of paths the plurality of paths are generated based on the configuration data.

In another embodiment again, generating the navigation efficiency score also includes evaluating conversation changes as a change from a first path within the plurality of paths of the workflow tree to a second path within the plurality of paths.

In a further additional embodiment, generating the intent score includes identifying a plurality of intent maps based on the configuration data and processing the plurality of conversations against a pre-configured list of intent phrases.

In another additional embodiment, the processing of the plurality of conversations against the plurality of the intent maps utilizes at least one of unsupervised machine learning, supervised machine learning, and domain expertise algorithms.

In a still yet further embodiment, the generation of the intent score also includes processing of the plurality of conversations against the plurality of the intent maps to correlate similar intents.

In still yet another embodiment, the identified intents within the plurality of intent maps include a ranking.

In still another embodiment again, the generation of the intent score also includes identifying matches above a pre-configured threshold based on at least the ranking of the intents within the plurality of intent maps.

In a still further additional embodiment, the pre-configured threshold is based on the configuration data.

In a variety of embodiments, the generation of the intent score also includes the generation of a fulfillment probability associated with the likelihood that the user's intent was accomplished.

In some embodiments, the fulfillment probability can be generated based on at least one of feedback survey data, unsupervised machine learning, supervised machine learning, and domain expertise algorithms.

In still additional embodiments, input data includes simulated chatbot conversation logs including a plurality of conversations between the chatbot and at artificial user the artificial user generates a plurality of pre-configured prompts for the chatbot.

In further embodiments, the pre-configured prompts are based on the configuration data.

In yet another additional embodiment, the method also includes generating at least one impact analysis report the impact analysis report provides a plurality of correlated scores, the correlated scores including a numerical causal prediction between at least one score of the processed parsed input data and at least one external metric.

In many embodiments, an artificial intelligence chatbot scoring system includes a processor and a storage device commutatively coupled to the processor. The storage device includes scoring logic configured to be processed by the processor to receive configuration data, receive input data, parse the input data, and process the parsed input data. The processing of the parsed input data includes generating a navigation efficiency score, generating a compliance score, generating an intent score, and generating a sentiment score. The system can also generate an overall performance score based on at least the configuration data, the navigation efficiency score, the compliance score, the intent score, and the sentiment score. The system may further comprise prediction logic configured to be processed by the processor to generate at least one impact analysis report the impact analysis report provides a plurality of correlated scores, the correlated scores including a numerical causal prediction between at least one score of the processed parsed input data and at least one external metric.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
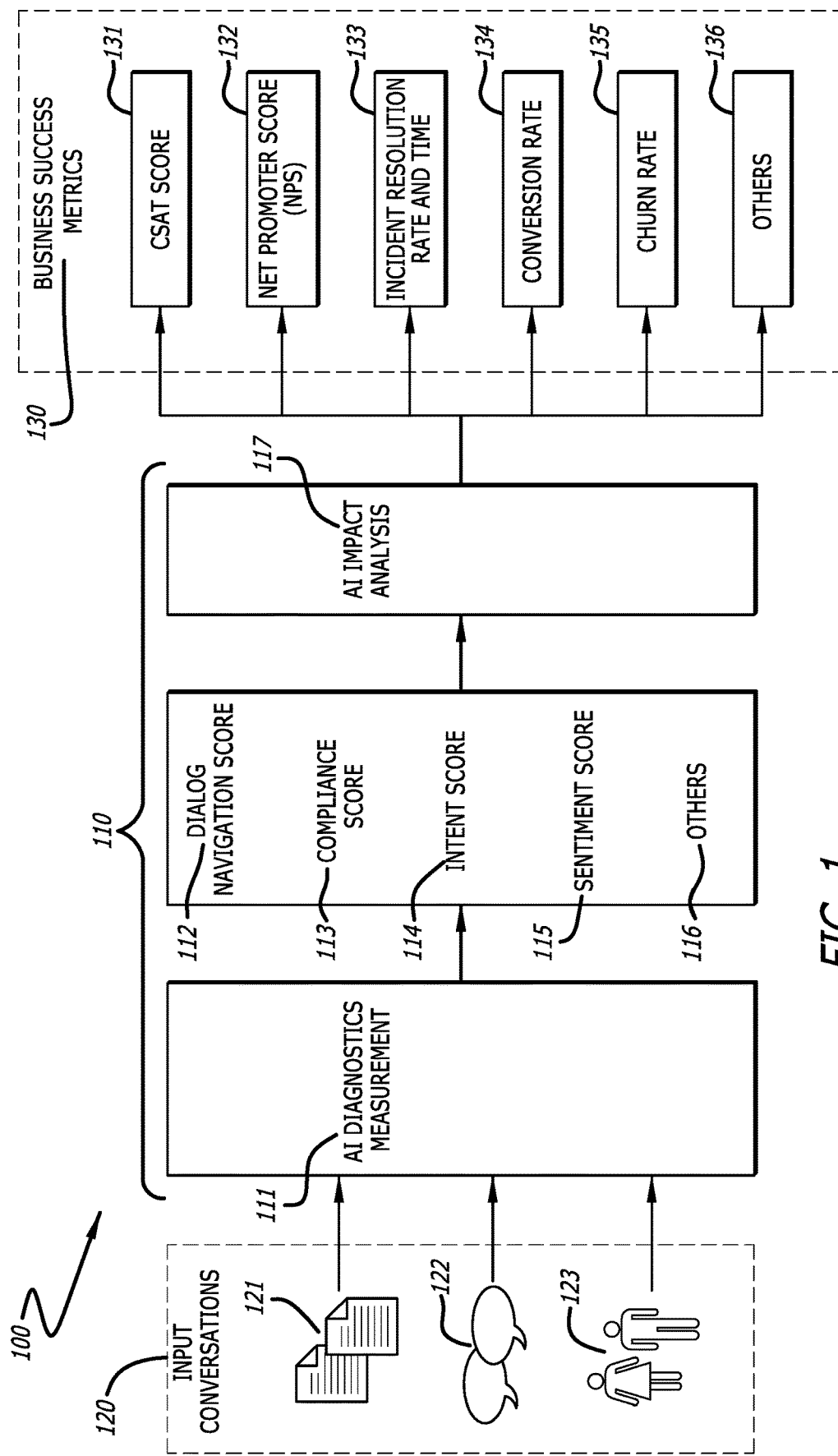
FIG. 1 is a system diagram of the artificial intelligence chatbot scoring system in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "chatbot" refers to any piece of software that can conduct a conversation with a user via auditory or textual methods. Such programs are often designed to convincingly simulate how a human would behave as a conversational partner, although all fail to pass the Turing test. Chatbots are typically used in dialog systems for various practical purposes including customer service or information acquisition. Some chatbots utilize sophisticated natural language processing systems, but many simpler ones scan for keywords within the user input, then pull a reply with the most matching keywords, or the most similar wording pattern, from a database. Chatbots are also contemplated to cover conversational artificial intelligence ("A.I.") utilized in messaging apps, speech-based assistants and other automated communication systems configured to create personalized customer experiences at scale.

The term "network device" should be construed as any electronic device with the capability of connecting to a network, downloading and installing mobile applications. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, etc. Herein, the terms "network device," "endpoint device," and "mobile device" will be used interchangeably. The terms "mobile application" and "application" should be interpreted as logic, software or other electronically executable instructions developed to run specifically on a mobile network device.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

In response to the problems outlined above, there is a need for users to generate scores that can be utilized to judge the effectiveness of artificial intelligence ("A.I.") chatbots. Systems and methods outlined herein provide a quantitative measure of performance, quality and effectiveness of Conversational AI. More particularly, many embodiments of the invention comprise a set of unique quality metrics configured for diagnosing the quality of conversations. Certain embodiments can also include a method to compute an aggregate/overall quality and performance score for the entire chatbot (a.k.a. "virtual assistant" or "virtual agent"). Further embodiments can include methods and systems to measure these metrics and identify the metrics which have the most impact on business success metrics. It is also contemplated that various systems and methods can automatically predict how an enterprise customer-facing bot will behave with real customers based on simulated conversations from simulated conversation data generated using at least one A.I. chatbot.

Referring to FIG. 1, a system diagram of the artificial intelligence chatbot scoring system in accordance with an embodiment of the invention is shown. In the depicted embodiment of FIG. 1, the artificial intelligence chatbot scoring system 100 comprises a performance scoring system 110 which utilizes input conversation data 120 to generate a plurality of performance scores. The input conversation data 120 may be comprised of any variety of historical conversation logs 121, real-time conversation data 122, and/or simulated user data 123. In many embodiments, the performance scoring system 110 may include an A.I. diagnostics measurement module 111, a scoring module that generates a plurality of scores comprising a dialog navigation score 112, a compliance score 113, an intent score 114, a sentiment score 115, and other scores 116 which can represent other categories. The generated component scores 112-116 can be utilized in various embodiments by an A.I. impact analysis module 117 to generate an overall score. In additional embodiments, the artificial intelligence chatbot scoring system 100 can utilize a plurality of business success metrics 130 to further generate impact analysis reports. In some embodiments, the business success metrics 130 can include customer satisfaction ("CSAT") scores 131, net promoter scores ("NPS") 132, incident resolution rates and times 133, conversion rates 134, churn rates 135, or any other viable business success metric 136.

In a variety of embodiments, the A.I. diagnostics measurement module 111 can be configured to analyze and parse the conversations within the input data utilizing natural language processing ("NLP") techniques, machine learning statistical methods, and/or rule based (heuristic) approaches. These processes can generate a plurality of segments, keywords, phrases and other data that can be utilized to generate component scores 112-116. It is contemplated that alternate methods of generating component scores can be utilized as well as various other component scores not specifically outline within the embodiment depicted in FIG. 1.

The component scores themselves may comprise a generated number between a certain scale (e.g., 1 to 100, 0 to 1, −1 to 1, etc.). In one embodiment, the generated component score is converted into a textual reflection of performance (e.g., letter grade, passing, failing, etc.) In certain embodiments, various component scores, such as, but not limited to, the dialog navigation score 112 may be comprised of, reflect, and/or affect sub-scores. By way of example and not limitation, sub-scores may comprise scores related to specific topics such as workflow change, number of repeated answers, and verbosity.

In many embodiments, dialog navigation scores can quantify an overall effectiveness of a conversation. Many chatbots are not yet fully capable of understanding human language and intents expressed, often resulting in poor responses and conversation flow. By examining various aspects of the parsed conversation data, the artificial intelligence chatbot scoring system 100 can generate a score associated with an overall navigation efficiency. Aspects of the parsed input conversation data can include, but is not limited to, the number of times the chatbot exhibits a comprehension failure (i.e., the chatbot doesn't understand the query or input by the user), the number of repeated answers or phrases provided by the chatbot, the amount of semantic extraction failures (i.e., the chatbot cannot recognize intent from the user because of changes in language use such as capitalizations and/or slang), the verbosity (length) of generated responses. These various aspects can be utilized to generate a sub-score which may then be aggregated into an overall dialog navigation score 112.

In further embodiments, the artificial intelligence chatbot scoring system 100 may generate a workflow tree based on a particular product or service associated with the function and/or training of the chatbot. In some embodiments, the workflow tree can provide a plurality of potential paths of various conversations that have a high probability of occurring with the chatbot. By way of example and not limitation, a chatbot trained to provide answers to clients regarding a company's services may have a particular series of pre-programmed answers tailored toward a specific number of topics. Answers or information requested by the user beyond these pre-configured topics may result in the chatbot referring the user to a different help option such as contacting a human representative. In these embodiments, the generation of a workflow tree may mirror the various pre-configured answers, with branches occurring at various topics within the answers.

As a result of the generation of a workflow tree, the dialog navigation score 112 may reflect various additional metrics such as the calculating when a conversation flow has been altered such that a user conversation interaction has jumped from a first branch or series of branches to a second branch or series of non-congruous branches. For example, when it is determined that the user has changed the initial subject/query and therefore is effecting a second function chatbot interaction, the navigation sub-score may be changed. Conversely, the jump from a first set of branches to a second set of branches within the generated workflow tree may indicate that the chatbot initially failed to correctly identify the initial subject/query of the user and should thus negatively affect the dialog navigation score 112. The computation of these jumps along the workflow tree can be determined via configuration data provided prior to analysis, or by receiving ground truth data from an external source including, but not limited to, human scoring methods.

Generally, computation of the final dialog navigation score is based on a set of contextual frame-based learning models configured to capture associations of specific conversations across the entire duration of the conversation. However, it is contemplated that other methods of computation may be utilized as required by the application.

In more embodiments, intent scores 114 can represent the success rates of intent fulfillment by the chatbot. The rate of intent fulfillment can be represented as a probability and or a number within a pre-configured range. It is noted that intent scores 114 are contemplated to correlate data beyond the mere detection of intent and additionally captures the rate of intent fulfillment success. In some embodiments, the determination of intent from the parsed input data utilizes multiple word phrases along with single word topic parsing. Recognition of these intent phrases may be generated based on at least one pre-configured list that may be passed into artificial intelligence chatbot scoring system 100 as configuration data. The frequency of these determined phrases and words can then be utilized to compute intents expressed by a user over time during the chatbot interaction. The rate or probability of fulfillment can further be generated, at least in certain embodiments, by feedback survey data received from users after the chatbot interaction, unsupervised machine learning, supervised machine learning, and/or domain expertise algorithms or input from domain experts.

In additional embodiments, the generation of the intent score 114 utilizes a configurable combination of custom trained named entity recognizers ("NERs"). Other techniques utilized may include, but are not limited to, a variety of techniques including unsupervised machine learning. In further embodiments, the models utilized to generate the intent score can be customized based on the type of business or use required by the chatbot.

In many embodiments, the generation of the intent score 114 can utilize intent maps. In these embodiments, intent recognition models can predict the probability of various scores to indicate the association factor of a given conversation to a list of intents which are derived through a combination of unsupervised machine learning, supervised machine learning, and/or domain expertise data. In some embodiments, the processing of a plurality of input conversation data 120 against at least one intent map can allow for correlations between similar identified intents to occur. In additional embodiments, these correlations may be utilized to generate rankings between the identified intents, and further provide those rankings to be used to identify a plurality of intents based upon the rankings exceeding a pre-configured threshold (which may be provided as configuration data). In some embodiments, the generation of the intent score 114 takes into account that virtually no machine learning model is fully accurate and as such, only determined intents above a preconfigured threshold level can be utilized for the determination of a composite intent score 114. In further embodiments, the composite intent score 114 can weight determinations based on the probability differences that have been assigned to each of the identified intents within the parsed input data conversation.

In still additional embodiments, the compliance score 113 can detect if the chatbot conversation includes any violations of regulatory or company policies. It is contemplated that certain embodiments may provide compliance scores 113 in real-time or near real-time to indicate immediate problems within the chatbot system. The compliance score 113 can reflect regulatory compliance which comprises scanning for a variety of regulatory compliances such as, but not limited to, HIPPA medical record violations, PCI compliance for credit card processing, compliance with the GDPR and/or reception or exposure of privacy-related data such as social security numbers. In further embodiments, compliance scores 113 can also be aggregated to further comprise computation of policy compliance such as internal company policies, levels of information provided to users, etc.

In some embodiments, sentiment scores 115 can be reflect key emotions being expressed by the users within conversations with the chatbot. By way of example and not limitation, the sentiment score 115 can comprise a range of emotions including, but not limited to, frustration, delight, gratitude, and/or confusion. In more embodiments, the artificial intelligence chatbot scoring system 100 can detect personality traits of a user based upon the language utilized within the chatbot conversation. These traits can generally be divided into positive and negative traits which can be factored into the overall sentiment score 115. Positive traits may include, but are not limited to, helpful, affable, humble, charming, keen, cultured, observant, optimistic, persistent, fair, sociable, trusting, etc. Negative traits can include, but are not limited to, arrogant, quarrelsome, rude, bossy, impulsive, sullen, thoughtless, obnoxious, unfriendly, picky, unruly, vulgar, etc.

It is contemplated that in a variety of embodiments, other scores 116 may be generated for use within the artificial intelligence chatbot scoring system 100. For example, scoring may occur to reflect bias, abuse, and or references to competitive products and/or services. It has been widely reported that artificial intelligence systems, in response to biased input, may generate biased dialog and/or answers. As a result, it is important to identify and mitigate bias within the chatbot. Successfully minimizing bias can help build trust between human users and the chatbots they interact with, which then provides better response and/or training data, which then feedbacks into increased user experiences to create a positive feedback loop. As such, bias related to any topic (e.g., gender, age, race, nationality, language nativism, etc.) may be identified across a plurality of demographic profiles by comparing critical responses within input conversation data 120 and looking for variances within the data, and taking actions that attempt to minimize such variations.

Abuse scores can reflect the amount of abusive, vulgar, or otherwise undesirable words within the chatbot responses of the input conversation data 120. In some instances, chatbots configured to acquire language from users have been maliciously bombarded with artificial input with abuse words in order to facilitate the chatbot to begin using the abusive words and/or phrases. In other embodiments, the chatbot may stumble onto an abusive word and/or phrase during its self-training. As such, abuse scores can be generated to evaluate the presence of these words and/or phrases. In some embodiments, the chatbot may be evaluated by the artificial intelligence chatbot scoring system 100 prior to release to the public to verify that no abuse words are currently found within the chatbot's answers.

Another type of score that can be generated correlates to the instances references appear within the chatbot input conversation data 120 that reference or identify a competitor's product and/or service. In many embodiments, the user will mention the competitor within the chat, which may be due to, for example, the user's liking or disliking the competitor's products, the user's desire for the competitive product and/or service, favorable pricing from the competitor, and/or expressed interest in switching to the competitor. These references are typically leading indicators of important events in the customer life cycle such as churn rate. Therefore, in some embodiments, the artificial intelligence chatbot scoring system 100 can generate a churn score which can correlate to the potential level of customer churn indicated by the chatbot input conversation data 120.

Once processed, the component scores 112-116 can be aggregated, in many embodiments, into an overall performance score. As discussed in more detail below with reference to FIG. 2B, the overall performance score may facilitate a faster overall evaluation of the performance of the chatbot. In certain embodiments, the overall performance score can be a number from 0 to 100. In other embodiments, the overall performance score can be a number from 0 to 1 and utilized as a weight in further neural network processing. Often, the generation of the overall performance score utilizes at least the component scores 112-116. The amount of weight given to each component score along with which specific component scores to utilize may be determined in response to provided configuration data. The performance score may also be displayed on a graphical user interface such as a dashboard with other chatbot metric data.

In response to the generation of the component scores 112-116 the artificial intelligence chatbot scoring system 100 can also utilize machine learning and rule-based artifacts (a.k.a. heuristics) to generate scores and/or impact reports that can reflect a predicted cause and effect relationship between the generated component scores 112-116, and a plurality of external metrics 130. As stated above, the external metrics 130 can include customer satisfaction ("CSAT") scores 131, net promoter scores ("NPS") 132, incident resolution rates and times 133, conversion rates 134, churn rates 135, or any other viable business success metric 136. In further embodiments, the impact reports may comprise a plurality of correlated scores which can include a numerical causal prediction between one of the component score 112-116 representing the processed parsed input data against at least one of the external business success metrics 130. By way of example and not limitation, the dialog navigation component score 112 may be indicative or correlate to the CSAT score of the chatbot. Based on these impact reports, chatbot programmers and/or administrators can better configure their chatbot to deliver increased customer satisfaction based on specific goals outlined in the impact reports.

In certain embodiments, the prediction of scores for these external metrics 130 can be correlated to the dialog navigation score 112, the compliance score 113, intent score 114, and sentiment score 115. The predictions are generated from machine learning models utilizing a variety of methods including, but not limited to, deep learning (i.e., deep neural networks), multi-class classification, and/or regression analysis. It is contemplated that each model for generating an impact analysis score within the A.I. impact analysis module 117 may be tailored for a variety of businesses, industries, and/or functions based on the desired application of the chatbot.

In a variety of embodiments, the generated component scores 112-116 and any impact scores generated by the A.I. impact analysis module 117 can be provided to the user via a graphical user interface on any network device or computing device. In some embodiments, the graphical user interface can be a dashboard with scores and overall evaluation grades. These displays, scores, and grades are discussed in more detail below with regard to FIGS. 2A and 2B.

Certain parameters of the artificial intelligence chatbot scoring system 100 can be preconfigured by providing configuration data. In certain embodiments, the configuration data can be provided as supplemental input to the conversation input data 120. Alternatively, or in conjunction, configuration data can be stored or pre-configured within the artificial intelligence chatbot scoring system 100. Configuration data may comprise a series of settings, weights, thresholds (e.g., for intent score matches, etc.), pre-configured artificial chatbot responses/scripts, scored chatbot pre-configured responses/scripts, and/or desired outputs.

Although the artificial intelligence chatbot scoring system 100 is depicted in the embodiment of FIG. 1 as a process, the system 100 may be practiced as a hardware device and/or software algorithm. In certain embodiments, one or more logics may be utilized that carry out operations necessary to practice the invention. By way of example and not limitation, the artificial intelligence chatbot scoring system 100 may comprise scoring logic that accepts input data and configuration data to process and generate a plurality of component scores that are then processed to generate an overall performance score. In further embodiments, the system 100 may also comprise prediction logic that can utilize the component and/or overall performance scores generated by the scoring logic to further generate one or more impact analysis reports. It is contemplated that such logics may be practiced in hardware as well as software (or a combination thereof) depending on the application required.

Figure 2A:
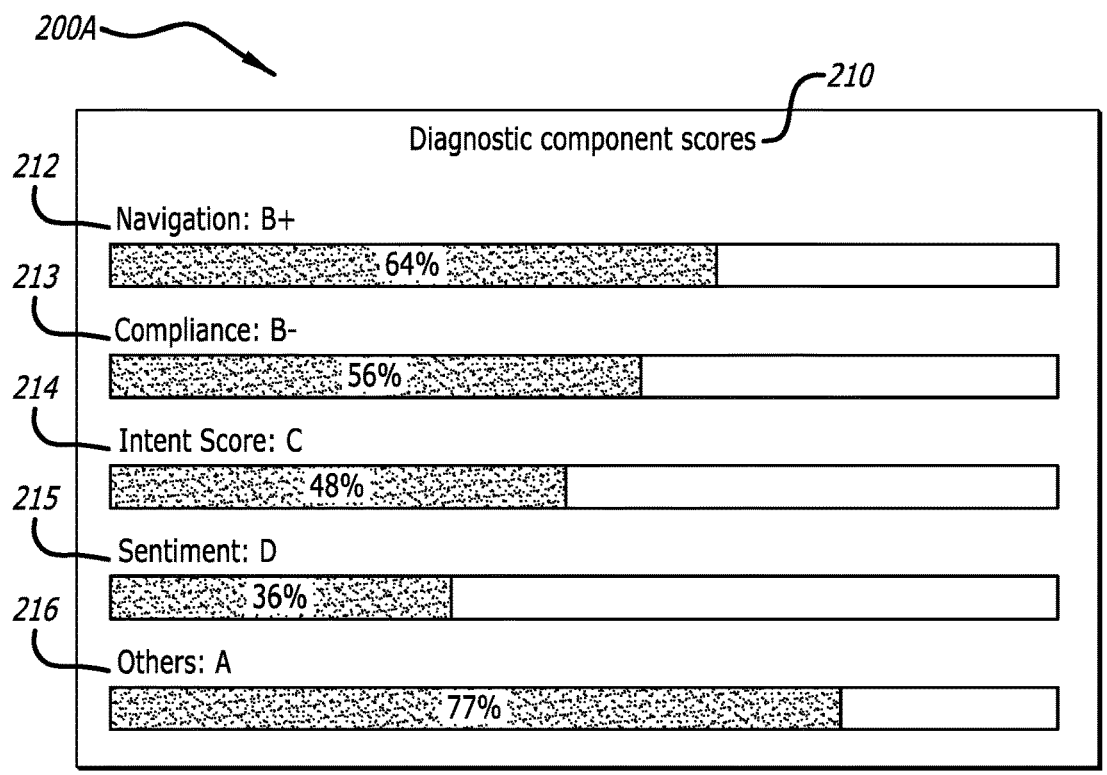
FIG. 2A is a conceptual illustration of component performance scores of the artificial intelligence chatbot in accordance with an embodiment of the invention.

Referring to FIG. 2A, a conceptual illustration of component performance scores 200A of the artificial intelligence chatbot in accordance with an embodiment of the invention is shown. In some embodiments, the generated component scores 112-116 can be utilized to generate a series of visual illustrations representing the component scores 212-216. Often, the results of the evaluation of a chatbot are utilized to generate a display for a user (e.g., system administrator, engineer, executive, etc.) which can be formatted to display a section of diagnostic component scores 210.

In the embodiment illustrated in FIG. 2A, the display of the diagnostic component scores 210 comprises a navigation grade and score 212, a compliance grade and score 213, an intent grade and score 214, a sentiment grade and score 215, and an "others" category grade and score 216 configured to display any remaining methods, scores, or data not represented by the other categories 212-215. It is contemplated that the types of categories displayed in the diagnostic component scores 210 can be configured by the user and can include the grade, the score or both.

Figure 2B:
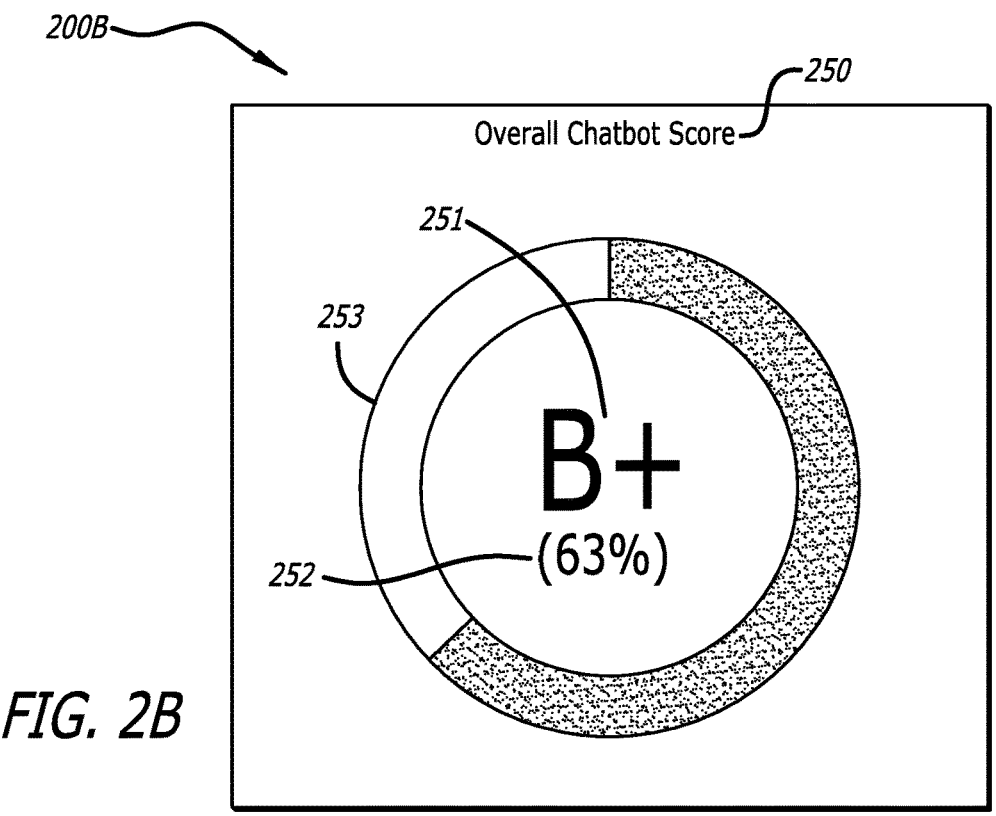
FIG. 2B is a conceptual illustration of an overall performance score of the artificial intelligence chatbot in accordance with an embodiment of the invention.

Referring now to FIG. 2B, a conceptual illustration of an overall performance score 200B of the artificial intelligence chatbot in accordance with an embodiment of the invention is shown. Similar to the generated component scores 112-

116 discussed above with reference to FIG. 2A, an overall chatbot score can be generated and utilized for display to a user. In a variety of embodiments, the overall chatbot score display 250 can include a grade 251, score 252, and visualized meter 253 providing a visual indication of the overall score 252. Typically, the generated overall chatbot score 200B can acts as a benchmark to compare the performance of a specific chatbot and/or other virtual agent.

The score 252, grade 251, and scale can be configured for use in evaluating chatbots across a similar domain and/or use case, to evaluate similar chatbots across different enterprises, and/or chatbots within the same enterprise but across different use areas. By way of example and not limitation, a chatbot configured for customer service may be compared against chatbots configured for sales. It is contemplated that the score 252, grade 251 and/or scale can be configured for various uses as needed by the user depending on the application desired.

Figure 3:
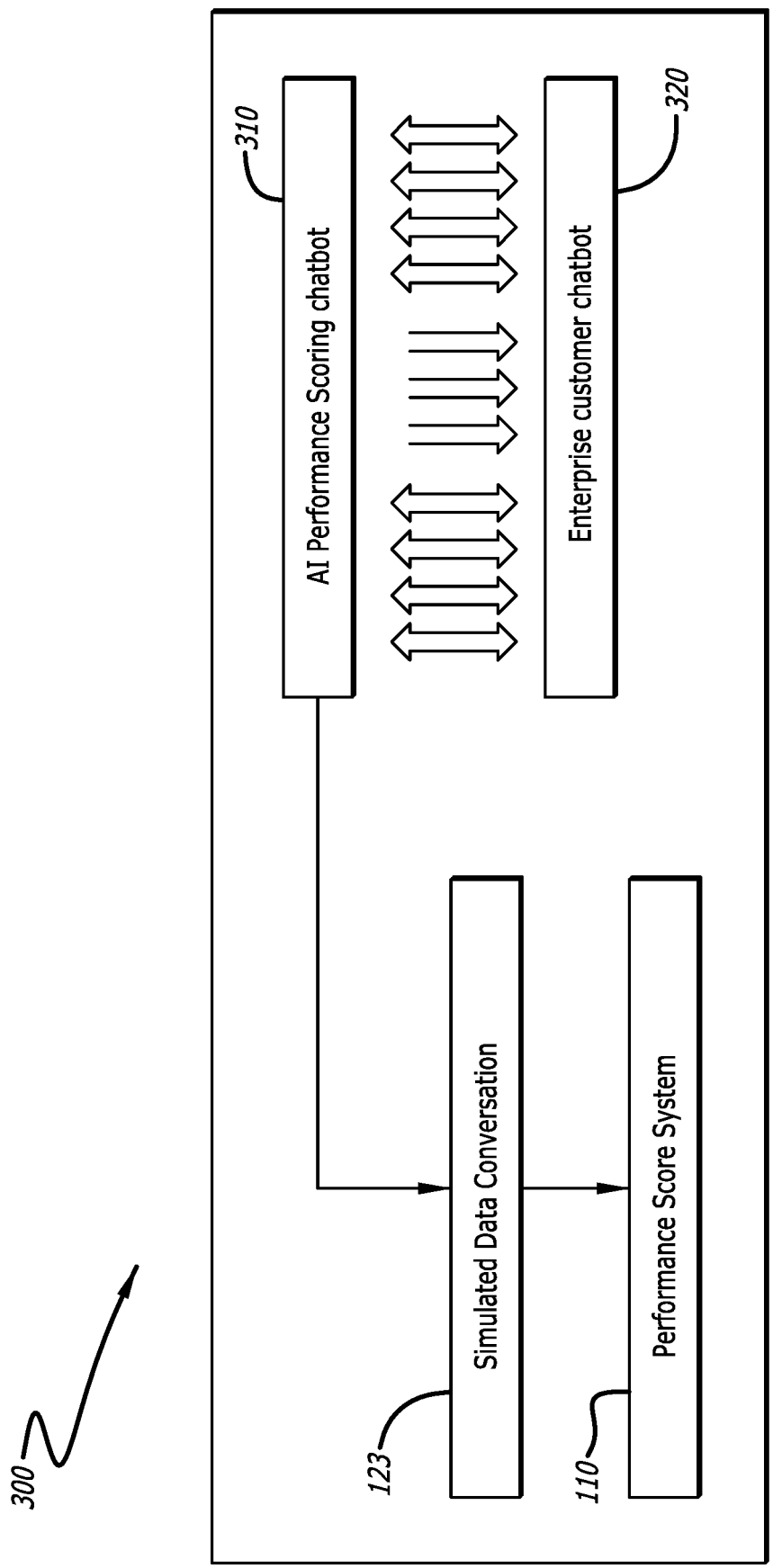
FIG. 3 is an exemplary diagram of a the generation of simulated conversation data for use as input data in the artificial intelligence chatbot scoring system in accordance with an embodiment of the invention.

Referring now to FIG. 3, an exemplary diagram of a the generation of simulated conversation data 123 for use as input data in the artificial intelligence chatbot scoring system 100 in accordance with an embodiment of the invention is shown. In many embodiments, the availability of historical chatbot logs 121 and real-time conversation data 122 may not be available or is only available in insufficient quantities for scoring a chatbot. In these embodiments, the generation of simulated conversation data 123 may allow for a sufficient input data 120 into the performance scoring system 110. In other embodiments, simulated conversation data 123 may be used as a supplement to other input data 120 such as historical chatbot logs 121 and/or real-time conversation data 122.

In some embodiments, the artificial intelligence chatbot scoring system 100 can include a specialized A.I. performance scoring chatbot 310 that is configured to interact with another customer-facing chatbot 320. In further embodiments, the A.I. performance scoring chatbot 310 can utilize proprietary dialog scripts and/or input sources such as, but not limited to, data dictionaries to simulate a plurality of conversations with the customer-facing chatbot 320. In this way, the artificial intelligence chatbot scoring system 100 can facilitate proactive analysis to predict chatbot behavior including in situations where the chatbot 320 has not yet been exposed to actual users.

In some embodiments, the generation of simulated conversation data 123 via A.I. performance scoring chatbots 310 can further facilitate analysis of the chatbot to avoid words, phrases, or patterns that are undesirable. By way of example and not limitation, the customer-facing chatbot 320 can be exposed to a plurality of abuse words (i.e., vulgar, or undesirable) by the A.I. performance scoring chatbot 310 which can subsequently be monitored to evaluate if the abuse words were repeated by the customer-facing chatbot 320.

It is contemplated that certain embodiments may comprise an A.I. performance scoring chatbot 310 which may include logic sufficient to generate an evaluation score instead of simulated conversation data 123. In these embodiments, the generated evaluation score may be based directly into the performance scoring system 110 to be evaluated and processed alongside the other generated component scores 112-116. It is also contemplated that the A.I. performance scoring chatbot 310 may, in some embodiments, be provided or otherwise obtained from a third party and not provided as part of the artificial intelligence chatbot scoring system 100. In this way, these embodiments may comprise communication logic sufficient to transmit and receive data related to simulated conversations and/or performance scores.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed:

1. A method of generating a score for an artificial intelligence chatbot, the method comprising:
   receiving configuration data;
   receiving input data;
   parsing the input data based on the configuration data;
   processing the parsed data wherein the processing includes:
   generating a navigation efficiency score;
   generating a compliance score;
   generating an intent score;
   generating a sentiment score;
   generating an overall performance score based on at least the configuration data, the navigation efficiency score, the compliance score, the intent score, and the sentiment score; and
   generating at least one impact analysis report wherein the impact analysis report provides a plurality of correlated scores, the correlated scores including a numerical causal prediction between at least one score of the processed parsed input data and at least one external metric.

2. The method of claim 1, wherein the input data comprises historical chatbot conversation logs including a plurality of conversations between the chatbot and at least one user.

3. The method of claim 1, wherein the input data comprises real-time chatbot conversation data.

4. The method of claim 2, wherein generating the navigation efficiency score comprises evaluating the number of chatbot comprehension failures.

5. The method of claim 2, wherein generating the navigation efficiency score comprises generating a workflow tree including a plurality of paths wherein the plurality of paths are generated based on the configuration data.

6. The method of claim 5, wherein generating the navigation efficiency score further comprises evaluating conversation changes as a change from a first path within the plurality of paths of the workflow tree to a second path within the plurality of paths.

7. The method of claim 2, wherein generating the intent score comprises identifying a plurality of intent maps based on the configuration data and processing the plurality of conversations against a pre-configured list of intent phrases.

8. The method of claim 7, wherein the processing of the plurality of conversations against the plurality of the intent maps utilizes at least one of: unsupervised machine learning, supervised machine learning, and domain expertise algorithms.

9. The method of claim 8, wherein the generation of the intent score further comprises processing of the plurality of conversations against the plurality of the intent maps to correlate similar intents.

10. The method of claim 9, wherein the identified intents within the plurality of intent maps include a ranking.

11. The method of claim 9, wherein the generation of the intent score further comprises identifying matches above a pre-configured threshold based on at least the ranking of the intents within the plurality of intent maps.

12. The method of claim 9, wherein the pre-configured threshold is based on the configuration data.

13. The method of claim 7, wherein the generation of the intent score further comprises the generation of a fulfillment probability associated with the likelihood that the user's intent was accomplished.

14. The method of claim 13, wherein the fulfillment probability can be generated based on at least one of: feedback survey data, unsupervised machine learning, supervised machine learning, and domain expertise algorithms.

15. The method of claim 1, wherein the input data comprises simulated chatbot conversation logs including a plurality of conversations between the chatbot and an artificial user wherein the artificial user generates a plurality of pre-configured prompts for the chatbot.

16. The method of claim 15, wherein the pre-configured prompts are based on the configuration data.

17. An artificial intelligence chatbot scoring system comprising:
a processor;
a storage device commutatively coupled to the processor, the storage device comprising:
scoring logic configured to be processed by the processor, the scoring logic to:
receive configuration data;
receive input data;
parse the input data;
process the parsed input data wherein processing the parsed input data includes:
generating a navigation efficiency score;
generating a compliance score;
generating an intent score; and
generating a sentiment score;
generate an overall performance score based on at least the configuration data, the navigation efficiency score, the compliance score, the intent score, and the sentiment score; and
prediction logic configured to be processed by the processor, the prediction logic to generate at least one impact analysis report wherein the impact analysis report provides a plurality of correlated scores, the correlated scores including a numerical causal prediction between at least one score of the processed parsed input data and at least one external metric.

18. A method of generating a score for an artificial intelligence chatbot, the method comprising:
receiving configuration data;
receiving input data;
parsing the input data based on the configuration data;
processing the parsed data wherein the processing includes:
generating a navigation efficiency score wherein the navigation efficiency score comprises at least one sub-score;
generating a compliance score;
generating an intent score;
generating a sentiment score;
generating an overall performance score based on at least the configuration data, the navigation efficiency score, the compliance score, the intent score, and the sentiment score; and
wherein generating the at least one sub-score comprises generating a similarity score based on the number of repeated answers generated by the chatbot within each of the plurality of conversations with the at least one user.

19. A method of generating a score for an artificial intelligence chatbot, the method comprising:
receiving configuration data;
receiving input data;
parsing the input data based on the configuration data;
processing the parsed data wherein the processing includes:
generating a navigation efficiency score wherein the navigation efficiency score comprises at least one sub-score;
generating a compliance score;
generating an intent score; and
generating a sentiment score;
generating an overall performance score based on at least the configuration data, the navigation efficiency score, the compliance score, the intent score, and the sentiment score; and
wherein generating the at least one sub-score of the navigation efficiency score comprises generating a verbosity score based on the number of words generated per chatbot response.

* * * * *